United States Patent

Bednarek et al.

[19]

[11] Patent Number: 4,555,535
[45] Date of Patent: Nov. 26, 1985

[54] ACRYLIC POLYURETHANE COATING COMPOSITION

[75] Inventors: Milan B. Bednarek, Carabobo Valencia, Venezuela

[73] Assignee: E. I. Du Pont de Nemours and Company, Wilmington, Del.

[21] Appl. No.: 587,062

[22] Filed: Mar. 7, 1984

[51] Int. Cl.$^4$ .............................................. C08L 1/14
[52] U.S. Cl. ........................................ 524/40; 524/91; 524/102; 524/103; 524/266; 524/590; 525/123
[58] Field of Search ................. 524/39, 40, 91, 102, 524/103, 266, 306, 590; 525/123

[56] References Cited

U.S. PATENT DOCUMENTS

| | | | |
|---|---|---|---|
| 2,855,421 | 10/1958 | Bunge et al. | 560/26 |
| 3,245,941 | 4/1966 | Mayer et al. | 524/306 |
| 3,275,583 | 9/1966 | Kloos | 528/297 |
| 3,330,814 | 1/1967 | Vastas | 525/330.1 |
| 3,558,564 | 1/1971 | Vasta | 528/58 |
| 4,020,216 | 4/1977 | Miller | 524/513 |
| 4,131,571 | 12/1978 | Crawley et al. | 524/40 |
| 4,215,023 | 7/1980 | Strolle | 525/123 |
| 4,234,468 | 11/1980 | Dalibor | 525/123 |

*Primary Examiner*—John Kight
*Assistant Examiner*—Nathan M. Nutter
*Attorney, Agent, or Firm*—Hilmar L. Fricke

[57] ABSTRACT

A coating composition in which the binder contains the following:
(1) an acrylic polymer having pendent hydroxyl containing ester groups of ester group A of the formula

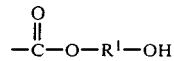

and ester group (B) which is either

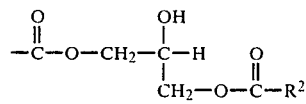

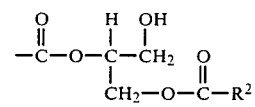

or wherein $R^1$ is a saturated hydrocarbon group having 2-4 carbon atoms, $R^2$ is a tertiary hydrocarbon group having 8 through 10 carbon atoms; and
(2) an aliphatic, aromatic or cycloaliphatic polyisocyanate;

The composition can be used as an unpigmented clear finish or can contain convention pigments and be used as a colored finish. The composition is useful for refinishing trucks and automobiles and as an original finish for trucks, automobiles, boats, outdoor equipment and the like since the resulting finish in glossy, durable and weatherable.

23 Claims, No Drawings

ACRYLIC POLYURETHANE COATING COMPOSITION

BACKGROUND OF THE INVENTION

This invention is directed to a polyurethane coating composition and in particular to an improved acrylic polyurethane coating composition.

Acrylic polyurethane coating compositions are well known and have been widely used to finish and repair finishes on automobiles and trucks. One particular high quality acrylic polyurethane coating composition described in Vasta U.S. Pat. No. 3,558,564 issued Jan. 26, 1971 has been widely used for finishing, refinishing and repairing automobiles and trucks. Another high quality polyurethane finish containing metallic flake pigments that provides excellent glamour and a high quality appearance and is used to finish automobiles and trucks is described in Crawley et al. U.S. Pat. No. 4,131,571 issued Dec. 26, 1978. However, there is a need to improve long term weatherability of finishes of these compositions.

SUMMARY OF THE INVENTION

The coating composition has a binder solids content of 5–75% by weight and contains 95–25% by weight of an organic liquid; the solids consist essentially of about (1) 50–95% by weight of an acrylic polymer having a backbone of polymerized monomers of the group of styrene, alkyl methacrylate, alkyl acrylate or mixtures thereof, each having 1–12 carbon atoms in the alkyl groups and having polymerized ethylenically unsaturated ester units that form ester groups pending from the carbon atoms of the backbone that comprise about 10 to 75% of the total weight of the polymer and are of ester group (A)

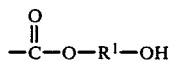

and ester group (B) which is either

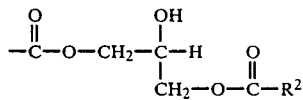

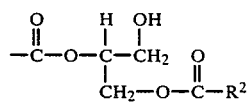

or a mixture of these groups; wherein
$R^1$ is a saturated hydrocarbon radical having 2–4 carbon atoms,
$R^2$ is a tertiary hydrocarbon group having 8–10 carbon atoms; and (2) 5–50% by weight of an aliphatic, aromatic or cycloaliphatic polyisocyanate.

DESCRIPTION OF THE INVENTION

The composition contains about 5–75% by weight of binder solids and about 95–25% by weight of an organic liquid. The binder solids of the composition are of about 50–95% by weight of an acrylic polymer and 5–50% by weight of a polyisocyanate.

The acrylic polymer is prepared charging the monomers that form the backbone of the polymer along with solvents and polymerization catalyst into a polymerization vessel and reacting about 80°–200° C. for about 1–5 hours to form a polymer having pendent carboxyl groups. These glycidyl ester that forms ester group (B) by reacting with carboxyl group is added with solvent an esterification catalyst and heated to reflux temperature of about 80°–200° C. for about 1–4 hours.

Typical monomers used to form the backbone are as follows: styrene, alkyl methacrylate having 1–12 carbon atoms such as methyl methacrylate, ethyl methacrylate, propyl methacrylate, butyl methacrylate, isobutyl methacrylate, pentyl methacrylate, hexyl methacrylate, ethyl hexyl methacrylate, nonyl methacrylate, decyl methacrylate lauryl methacrylate, alkyl acrylates having 1–12 carbon atoms in the alkyl group such as methyl acrylate, ethyl acrylate, propyl acrylate, butyl acrylate, isobutyl acrylate, pentyl acrylate, hexyl acrylate, ethyl hexyl acrylate, nonyl acrylate, decyl acrylate, lauryl acrylate. Hydroxy alkyl acrylates and methacrylates are used to provide ester group (A) and typically are hydroxy and ethyl acrylate, hydroxy propyl acrylate, hydroxybutyl acrylate, hydroxy ethyl methacrylate, hydroxy propyl methacrylate and hydroxy butyl methacrylate. About 5–25% by weight of an ethylenically unsaturated carboxylic acid is also used to provide an esterification site for glycidyl ester which forms ester group (B). Typical acids are methacrylic acid and acrylic acid. Dicarboxylic acids such as itaconic acid can be used.

The glycidyl ester used to form ester group (B) of the polymer has the formula

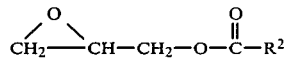

where $R^2$ is a tertiary aliphatic hydrocarbon of 8–10 carbon atoms and is described in U.S. Pat. No. 3,275,583 issued Sept. 27, 1966.

The acrylic polymer has a weight average molecular weight of about 5,000–60,000 determined by gel permeation chromatography using polymethylmethacrylate as a standard. Preferably, the polymer has a weight average molecular weight of about 20,000–40,000.

Suitable polymerization catalysts that are used in the process to prepare the acrylic polymer are tertiary butyl peroxide, cumen hydroperoxide, azobisisobutyronitrile and the like. To prepare the ester group (B) esterification catalyst, such as quaternary bases or salts or benzyltrimethylammonium hydroxide, benzyltrimethylammonium chloride, octadecyltrimethylammonium chloride, or an amine, such a triethylamine, are used.

Suitable solvents which are used to prepare the acylic polymer are toluene, xylene, butyl acetate, acetone, methylisobutyl ketone, methylethyl ketone, and other aliphatic esters, ethers, ketones and other solvents which are nonreactive with the monomers used to form the acrylic polymer.

One preferred acrylic polymer contains 20–40% by weight styrene, 10–30% by weight methyl methacrylate, 5–25% hydroxy ethyl methacrylate and 5–25% by weight methacrylic acid which has been esterified with the aforementioned glycidyl ester to provide about 15–65% by weight of ester group (B).

Preferably, the acrylic polymer contains a molar ratio of ester group (A) to ester group (B) of about 1:1 to 1:2.5.

An advantage of the acrylic polymer used in the composition of this invention is that it is prepared without an acid anhydride constituent as is the acrylic polymer of the aforementioned Vasta '564 patent and is not adversely affected by contamination of a slight amount of water in the polymerization process. Finishes formed from the coating composition of this invention are less susceptible to hydrolysis and degradation by ultraviolet light than finishes formed with prior art acrylic polyurethane compositions and have excellent weatherability.

Typical polyisocyanates that can be used to form the coating composition are aliphatic, aromatic or cycloaliphatic polyisocyanates. Typical polyisocyanates are as follows:

diphenylmethane-4,4'-diisocyanate,
diphenylene-4-4'-diisocyanate,
toluene-2,4-diisocyanate,
toluene-2,6-diiocyanate,
3,3'-dimethoxy-4-4'-diphenylene diisocyanate
methylene-bis-(4-cyclohexylisocyanate)
tetramethylene diisocyanate,
hexamethylene diisocyanate,
decamethylene diisocyanate,
ethylene diisocyanate,
ethylidene diisocyanate,
propylene-1,2-diisocyanate,
cyclohexylene-1,2-diisocyanate,
m-phenylene diisocyanate,
p-phenylene diisocyanate
3,3'-dimethyl-4,4'-biphenylene diisocyanate,
3,3'-dimethoxy-4,4'-biphenylene diisocyanate,
3,3'-diphenyl-4,4'-biphenylene diisocyanate,
4,4'-biphenylene diisocyanate,
3,3'-dichloro-4,4'-biphenylene diisocyanate,
furfurylidene diisocyanate,
bis-(2-isocyanatoethyl)fumarate,
1,3,5-benzene triisocyanate,
para,para',para''-triphenylmethane triisocyanate,
3,3'-diisocyanatodiphropy ether,
xylylene diisocyanate,
-diphenyl propane-4,4'-diisocyanate.

The product of one of the above isocyanates with a deficient amount of a low molecular weight alcohol, such as, 1,4-butane diol, glycerine, trimethylolpropane, hexane diol or a triol may be used as a polyisocyanate in the coating composition of this invention. These polyisocyanates can be made according to Bunge et al. U.S. Pat. No. 2,855,421, issued Oct. 7, 1958.

Another preferred polyisocyanate is a biuret of the formula:

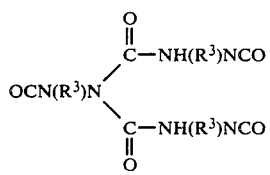

wherein $R^3$ is an aliphatic hydrocarbon group having 1-12 carbon atoms. One particularly preferred biuret is the biuret of hexamethylene diisocyanate. These biurets can be made according to Mayer et al. U.S. Pat. No. 3,245,941, issued Apr. 12, 1966.

One particularly preferred polyisocyanate that forms a high quality durable and weatherable product is

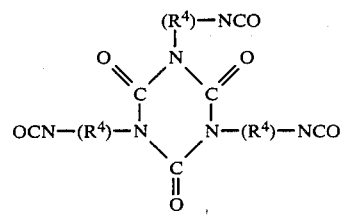

where $R^4$ is a hydrocarbon group having 6 carbon atoms. The above polyisocyanate is 1,3,5-tris(6-isocyanatohexyl)1,3,5-triazine 2,4,6(1H,3H,5H)trione. Commercially available polyisocyanate compositions contain the above polyisocyanate and small amounts of higher molecular weight moieties such as dimers, trimers and hexamers of the above polyisocyanate.

The composition can be used as a clear coat which is unpigmented or can contain relatively small amounts of pigment having the same refractive index as the resulting finish such as silica. These clear coats are generally used over a base coat. Usually the clear coat is applied over the base coat while the base coat is still wet and then both coats are cured.

The composition can be pigmented in a pigment to binder weight ratio of about 0.1/100 to 100/100. Conventional pigments can be used in the composition such as metallic oxides, preferably titanium dioxide, zinc oxide, iron oxide, and the like, metallic powders, metallic hydroxides, phthalocyanine pigments such as copper phthalocyanine blue or green, quinacridones, sulfates, carbonates, carbon blacks, silica, and other pigments, organic dyes, lakes, and the like.

Metallic flake pigments used in the composition are any of those pigments that provide a finish with metallic glamour. These pigments include any of the conventional metallic flake pigments, such as aluminum flake, nickel flake, nickel-chrome flake, but also includes "Fire Frost" flake which is a polyester flake coated with a layer of vapor-deposited aluminum and "Afflair" pigments which are mica flakes coated with titanium dioxide.

Generally, when metallic flake pigments are used in the composition, about 1-15% by weight, based on the weight of the binder, of cellulose acetate butyrate is used in addition to the above binder constituents. The cellulose acetate butyrate used in the composition has a butyryl content of about 50-60% by weight, a hydroxyl content of 1.0-3.0% by weight and has a viscosity of about 0.02-5.0 seconds measured at 25° C. according to ASTM D-1343-36. One preferred cellulose acetate butyrate that forms a high glamour finish has a butyryl content of 53-55% by weight and a viscosity of about 0.1-0.5 seconds and a hydroxyl content of 1.5-2.5% by weight.

The composition also can contain in addition to the binder about 0.05-1.0% by weight, based on the weight of the binder, of an alkyl acid phosphate having 1-12 carbon atoms in the alkyl group. Typical alkyl acid phosphates are monoalkyl acid phosphates or mixtures thereof and have an acid No. of about 4-250 and are as follows:

methyl acid phosphate
ethyl acid phosphate
propyl acid phosphate
isopropyl acid phosphate
pentyl acid phosphate hexyl acid phosphate
2-ethylhexyl acid phosphate
octyl acid phosphate
nonyl acid phosphate
decyl acid phosphate and
lauryl acid phosphate.

Butyl acid phosphate is one preferred compound that provides a proper curing composition. One technique for preparing this butyl phosphate is to react phosphorus pentoxide with butanol giving a product that has an acid number of about 100–150.

The coating composition can contain in addition to the above components about 0.1–5% by weight, based on the weight of the binder, of ultraviolet light stabilizers. Preferably a blend of a benzotriazole and a hindered amine light stabilizer is used.

Typical ultraviolet light stabilizers that are useful are as follows:

Benzophenones such as hydroxydodecyl benzophenone, 2,4-dihydroxybenzophenone, hydroxybenzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic mono-esters of 2,2',4-trihydroxy-4'-alkoxybenzophenone, 2-hydroxy-4-methoxy-2'-carboxybenzophenone; triazoles such as 2-phenyl-4-(2'-4'-dihydroxy-benzoyl)triazoles, substituted benzotriazoles such as hydroxyphenyltriazoles such as 2-(2'-hydroxy-5'-methylphenyl)benzotriazole, 2-(2'-hydroxyphenyl)benzotriazole, 2-(2'-hydroxy-5'-octylphenyl)naphthotriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylolpropane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5,-di-t-butyl-4-hydroxyphenyl propionic acid, asymmetrical oxalic acid diarylamides, alkylhydroxyphenylthioalkanoic acid esters, dialkylhydroxyphenylalkanoic acid esters of di- and tri-pentaerythritol, phenyl- and naphthlene-substituted oxalic acid diamides, methyl-b-(3,5-di-t-butyl-4-hydroxyphenyl)propionate, α.α'-bis(2-hydroxyphenyl)diisopropylbenzene, 3,5'-dibromo-2'-hydroxyacetophenone, ester derivatives of 4,4-bis(4'-hydroxyphenyl)pentanoic acid wherein there is at least one unsubstituted position ortho to the aromatic hydroxyl groups, organophosphorus sulfides such as bis(diphenyl-phosphinothioyl)monosulfide and bis(-diphenylphosphino-thioyl)disulfide, 4-benzoyl-6-(dialkylhydroxybenzyl)resorcinol, bis(3-hydroxy-4-benzoylphenoxy)diphenylsilane, bis(3-hydroxy-4-benzoylphenoxy)dialkylsilane, 1,8-naphthalimides, α-cyano- β, β-diphenylacrylic acid derivatives, bis(2-benzoxazolyl)alkanes, bis(2-naphthoxa-zolyl)alkanes, methylene malonitriles containing aryl and heterocyclic substitutes, alkylenebis(dithio)carbamate, 4-benzoyl-3-hydroxyphenoxyethyl acrylate, 4-benzoyl-3-hydroxyphenoxyethyl methacrylate, aryl- or alkyl-substituted acrylonitriles, 3-methyl-5-isopropyl-phenyl-6-hydroxycoumarone.

Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate(5)]-Ni, bis[-phenyldithiocarbamato]-Ni(II), and others listed in the above patent, column 8, line 44 through line 55.

The following ultraviolet light stabilizers are particularly preferred:

bis(1,2,2,6,6-pentamethyl-4-piperidinyl)decanedioate, a blend of

2-[2'-hydroxy-3',5'-1(1-1-dimethyl-propyl)phenyl]-benzotriazole and bis-[4-(1,2,2,6,6-pentamethylpiperidyl)]2-butyl-2-[(3,5-t-butyl-4-hydroxyphenyl)methyl]-propanedioate.

The stabilizers can be used in any ratio however, a 1:1 ratio of benzotriazole to propanedioate is preferred.

The coating composition can contain in addition to the above compounds about 0.01–0.10% by weight, based on the weight of the binder, of an organo metal catalyst and/or an amine catalyst such as 1,4 diaza-bicyclo (2,2,2) octane. Typical organo metal catalysts are stannous dioctoate and alkyl metal laurates, such as alkyl tin laurate, alkyl cobalt laurate, alkyl manganese laurate, alkyl zirconium laurate, alkyl nickel laurate. The alkyl group can have from 1–12 carbon atoms. Particularly useful catalysts are dibutyl tin dilaurate and stannous dioctoate.

The coating composition also can contain in addition to the above compounds about 0.05–2% by weight, based on the weight of the binder, of poly 2-ethylhexyl acrylate. Another component that can be used in the coating composition is about 0.05–2% by weight, based on the weight of the binder, of polydimethyl siloxane. Both of these compounds are used to reduce surface imperfections in the dried and cured paint film.

Any of the aforementioned solvents can be used to form the composition and can be used to reduce the composition to an application viscosity.

The coating composition is applied by conventional techniques such as brushing, spraying, dipping, flow coating and the like, and either dried at ambient temperatures or a elevated temperatures of 50°–100° C. for 2–30 minutes. The resulting layer of coating is about 0.1–5 mils thick. Usually, about a 1–3 mil thick layer is applied.

The composition can be applied over a wide variety of substrates such as metal, wood, glass, plastics, primed metals, or previous coated or painted metals. If used to repair an existing finish, the composition is usually applied over an acrylic primer surface. The composition can be applied directly to an acrylic lacquer or enamel finish that has been sanded and cleaned with solvent. The composition can be applied as an original finish over an epoxy primer or other conventional primers or can be applied directly to bare metal. It is preferred to have the metal surface treated with a phosphate.

The following Examples illustrate the invention. The parts and percentages are by weight unless otherwise specified.

EXAMPLE

An acrylic resin solution is prepared by charging the following constituents into a polymerization vessel containing a mixer, a thermometer and a heat source:

|  | Parts by Weight |
| --- | --- |
| Portion 1 | |
| Styrene monomer | 94.7 |
| Methyl methacrylate monomer | 97.0 |
| Hydroxyethyl methacrylate monomer | 36.2 |
| Methacrylic acid | 12.4 |
| Ethylene glycol monoethyl ether acetate | 765.5 |
| Portion 2 | |
| Ethylene glycol monoethyl ether acetate | 23.2 |
| t-Butyl peracetate | 1.5 |
| Portion 3 | |
| Styrene monomer | 482.8 |
| Methyl methacrylate monomer | 257.2 |
| Hydroxy ethyl methacrylate monomer | 199.8 |
| Methacrylic acid | 170.0 |
| Portion 4 | |
| Ethylene glycol mono ethyl ether acetate | 210.0 |
| Toluene | 73.6 |
| t-Butyl peracetate | 28.4 |
| Portion 5 | |
| "Cardura" E ester(a mixed glycidyl ester of a synthetic tertiary carboxylic acid of the formula 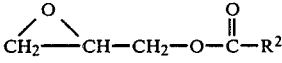 where $R^2$ is a tertiary aliphatic hydrocarbon group of 10 carbon atoms.) Benzyltrimethyl ammonium hydroxide | 0.6 |
| Portion 6 | |
| Ethylene glycol monoethylether acetate | 363.3 |
| Toluene | 111.5 |
| Total | 3504.7 |

Portion 1 was charged into the polymerization vessel and mixed and heated to its reflux temperature of about 138° C. Portion 2 was premixed and added over 30 seconds to initiate the polymerization reaction. Portion 3 was premixed and added at a uniform rate over 90 minutes while maintaining the resulting reaction mixture at its reflux temperature. Portion 4 was premixed and 75% of Portion 4 was added with Portion 3 above. The remaining 25% of Portion 4 was added at a uniform rate over a 50 minute period while maintaining the reaction mixture at its reflux temperature and the reaction mixture was held at this temperature for an additional 10 minutes. Portion 5 was premixed and added and the reaction mixture was held at its reflux temperature of about 155° C. The reaction was continued for about 4–5 hours until the acid number of the resulting polymer was about 2–4. Portion 6 was added and the resulting polymer solution was allowed to cool to an ambient temperature.

The resulting acrylic polymer solution had a 55% polymer solids content, a Gardner Holdt viscosity measured at 25° C. of about Z and a relative viscosity measured at 25° C. of about 1.077. The polymer had the following composition 30% sytrene, 18.4% methyl methacrylate, 12.3% hydroxyethyl methacrylate, 9.3% methacrylic acid and 30% "Cardura" E ester and has an acid No. of 3 and a weight average molecular weight of about 28,000 measured by gel permeation chromatography using polymethyl methacrylate as a standard.

Acrylic polymer solution 1 was prepared by blending the following constituents:

|  | Parts by Weight |
| --- | --- |
| Acrylic polymer solution(prepared above) | 56.24 |
| Ethylene glycol monoethyl ether acetate | 21.50 |
| Toluene | 5.42 |
| Ethyl acetate | 13.46 |
| Bis-[4-(1,2,2,6,6-pentamethyl piperidyl)]-2-butyl-2-[(3,5-t-butyl-4-hydroxyphenyl) methyl]-propanedioate | 0.31 |
| 2-[2'-hydroxy-3',5'-1)1-1-dimethyl propyl)phenyl]benzotriazole | 0.31 |
| Dibutyltindilaurate solution(0.2% solids in ethyl acetate) | 1.83 |
| "Modaflow" solution(10% solids of poly 2-ethylhexyl acrylate in organic solvent) | 0.31 |
| Polydimethyl siloxane solution (5% solids in xylene) | 0.62 |
| Total | 100.00 |

A polyisocyanate solution was prepared by blending together the following constituents:

|  | Parts by Weight |
| --- | --- |
| "Desmodur" N3390(polyisocyanate having the structure described previously and is 1,3,5-tris(6-isocyanatohexyl)1,3,5-triazine 2,4,6(1H, 3H, 5H) trione and small amounts of higher molecular weight moieties) | 42.4 |
| Ethyl acetate | 57.6 |
| Total | 100.0 |

Clear paint 1 was formulated by blending the following:

|  | Parts by Weight |
| --- | --- |
| Acrylic polymer solution 1 (prepared above) | 80.2 |
| Polyisocyanate solution 1 (prepared above) | 19.8 |
| Total | 100.0 |

The above clear paint 1 was sprayed on a steel panel coated with a pigmented acrylic lacquer base coat. The resulting coated panel was dried at ambient temperatures. The resulting coating had an outstanding appearance, excellent gloss measured at 20° and 60° and excellent distinctness of image. Flexibility, adhesion, chip resistance, recoat properties, chemical resistance, humidity resistance and durability were measured and were at a level acceptable for commercial clear paint.

Acrylic polymer solution 2 was prepared by blending the following constituents:

|  | Parts by Weight |
| --- | --- |
| Acrylic polymer solution(prepared above) | 48.75 |
| Ethylene glycol monoethyl ether acetate | 21.52 |

| | Parts by Weight |
|---|---|
| Toluene | 5.42 |
| Ethyl acetate | 13.48 |
| Xylene | 7.89 |
| Bis-[4-(1,2,2,6,6-pentamethyl piperidyl)]-2-butyl-2-[(3,5-t-butyl-4-hydroxyphenyl)methyl]-propanedioate | 0.27 |
| 2-[2'-hydroxy-3',5'-1(1-1-dimethyl propyl)phenyl]benzotriazole | 0.27 |
| Dibutyltindilaurate solution(0.2% solids in ethyl acetate) | 1.59 |
| "Modaflow" solution(described above) | 0.27 |
| Polymethyl siloxane solution (described above) | 0.54 |
| Total | 100.00 |

A polyisocyanate solution 2 was prepared by blending the following constituents:

| | Parts by Weight |
|---|---|
| "Desmodur" N3390(described above) | 64.7 |
| Ethyl acetate | 35.3 |
| Total | 100.00 |

Clear paint 2 was formulated by blending the following constituents:

| | Parts by Weight |
|---|---|
| Acrylic polymer solution 2 (prepared above) | 88.3 |
| Polyisocyanate solution 2 (prepared above) | 11.7 |
| Total | 100.0 |

The above clear paint 2 was sprayed on a steel panel coated with a pigmented acrylic lacquer base coat. The resulting coated panel was dried at ambient temperatures. The resulting coating had an outstanding appearance, excellent gloss measured at 20° and 60°, excellent distinctness of image. Flexibility, adhesion, chip resistance, recoat properties, chemical resistance, humidity resistance and durability were measured and were at a level acceptable for a commercial clear paint.

A white pigmented acrylic polymer composition was prepared as follows:

| | Parts by Weight |
|---|---|
| Portion I | |
| Acrylic polymer solution (prepared above) | 8.80 |
| Titanium dioxide pigment | 26.40 |
| Ethylene glycol monoether ether acetate | 8.76 |
| Fumed silica | 0.04 |
| Portion II | |
| Acrylic polymer solution (prepared above) | 41.10 |
| "Modaflow" solution(described above) | 0.25 |
| Polymethyl siloxane solution (described above) | 0.50 |
| Ethyl acetate | 12.60 |
| Dibutyltindilaurate solution (described above) | 1.55 |
| Total | 100.00 |

Portion 1 is premixed and charged into a conventional sand mill and ground to fineness of 0.1 microns. Portion 2 is premixed and then portion 1 is added to portion 2 with mixing to form a white pigmented composition.

Polyisocyanate solution 3 was formulated by blending the following constituents:

| | Parts by Weight |
|---|---|
| "Desmodur" N3390(described above) | 82.6 |
| Butyl acetate | 8.7 |
| "Solvesso" 100 (hydrocarbon solvent) | 8.7 |
| Total | 100.0 |

A white paint was prepared by thoroughly blending the following:

| | Parts by Weight |
|---|---|
| White pigmented acrylic polymer composition (prepared above) | 89.8 |
| Polyisocyanate solution 3 | 10.2 |
| Total | 100.0 |

The white paint was reduced to a spray viscosity with conventional solvents and sprayed onto steel panels primed with a pigmented alkyd resin primer and dried at ambient temperatures. The resulting coating was about 2-3 mils thick. The resulting coating had an outstanding appearance, excellent gloss and distinctness of image and commercially acceptable chip resistance, humidity resistance, chemical resistance and durability.

A second white paint was formulated using the indentical ingredients as above except the biuret of hexamethylene diisocyanate was substituted for the "Desmodur" N 3390 and the resulting paint was reduced to a spray viscosity and applied to steel panels having the same alkyd resin primer as above. The resulting coating was dried at ambient temperatures and the dried coating was about 2-3 mils in thickness.

The coating had a good appearance, good gloss and distinctness of image and acceptable chip resistance, humidity resistance, chemical resistance and durability.

We claim:

1. A coating composition having a binder solids content of 5-75% by weight and 95-25% by weight in an organic liquid; wherein the binder consists essentially of about (1) 50-95% by weight of an acrylic polymer having a backbone consisting essentially of polymerized monomers selected from the group consisting of alkyl methacrylate, alkyl acrylate each having 1-12 carbon atoms in the alkyl group, styrene or mixtures thereof and polymerized ethylenically unsaturated ester monomers that form ester groups pending from the carbon atoms of the polymer backbone and consist of about 10 to 75% of the total weight of the polymer and consist of ester group (A)

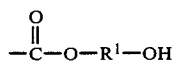

and ester group (B) selected from the group consisting of

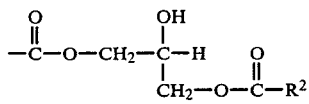

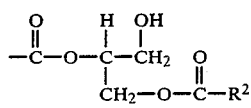

or mixtures thereof; wherein ester group B is formed by reacting carboxyl groups pending from the backbone of the acrylic polymer with glycidyl esters of the formula

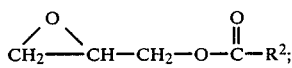

$R^1$ is a saturated hydrocarbon group having 2–4 carbon atoms,
$R^2$ is a tertiary hydrocarbon group having 8 through 10 carbon atoms; and (2) 5–50% by weight of an aliphatic, aromatic or cycloaliphatic polyisocyanate.

2. The coating composition of claim 1 in which the polyisocyanate has the formula

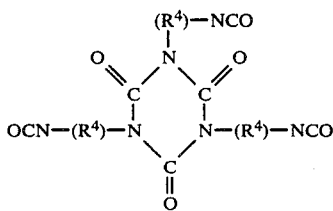

where $R^4$ is a hydrocarbon group having 6 carbon atoms.

3. The coating composition of claim 1 in which the polyisocyanate is the biuret of hexamethylene diisocyanate.

4. The coating composition of claim 1 in which the molar ratio of ester group (A) to ester group (B) is about 1:1 to 1:25.

5. The coating composition of claim 4 in which the acrylic polymer consists essentially of 20–40% by weight styrene, 10–30% by weight methyl methacrylate, 5–25% by weight of hydroxyl ethyl methacrylate and 15–65% by weight of ester group (B).

6. The coating composition of claim 1 containing in addition about 0.05–1.0% by weight, based on the weight of the binder, of an alkyl acid phosphate.

7. The coating composition of claim 6 in which the alkyl acid phosphate is butyl acid phosphate.

8. The coating composition of claim 1 containing in addition about 0.01–0.10% by weight, based on the weight of the binder, of an organo metal catalyst.

9. The coating composition of claim 8 in which the catalyst is dibutyltin dilaurate.

10. The coating composition of claim 1 containing in addition about 0.5–5% by weight, based on the weight of the binder, of ultraviolet light stabilizer.

11. The coating composition of claim 10 in which the ultraviolet light stabilizer is a blend of a benzotriazole and a hindered amine light stabilizer.

12. The coating composition of claim 1 containing in addition pigment in a pigment to binder ratio of about 0.1/100 to 100/100.

13. The coating composition of claim 12 in which the pigment contains metallic flake pigments.

14. The coating composition of claim 13 containing in addition 1–15% by weight, based on the weight of the binder, of cellulose acetate butyrate having a butyryl content of about 50–60% by weight, a hydroxyl content of about 1.0–3.0% by weight, and a viscosity of 0.02–5.0 seconds measured at 25° C. according to ASTM D-1343-56.

15. The coating composition of claim 14 containing in addition about 0.05–1.0% by weight, based on the weight of the binder, of an alkyl acid phosphate, 0.5–5% by weight, based on the weight of the binder, of a blend of ultraviolet light stabilizer of a benzotriazole and a hindered amine light stabilizer and 0.01–0.10% by weight, based on the weight of the binder, of an alkyl tin laurate catalyst.

16. The coating composition of claim 1 wherein
(1) the acrylic polymer has a backbone of styrene and methyl methacrylate and ester group A is from hydroxy ethyl acrylate and ester group B is the esterification of methacrylic acid of the backbone with glycidyl ester of a tertiary carboxylic acid and wherein $R^1$ is $(CH_2)_2$, and $R^2$ is a tertiary hydrocarbon group having 8 through 10 carbon atoms; and
(2) the polyisocyanate is 1,3,5-tris(6-isocyanatohexyl)1,3,5-triazine 2,4,6(1H,3H,5H)trione.

17. The coating composition of claim 16 containing in addition 0.5–5% by weight, based on the weight of the binder, of a blend of ultraviolet light stabilizers consisting of 2-[2-hydroxy-3,5-1(1-1-dimethylpropyl)phenyl]-benzotriazole and bis-[4-(1,2,2,6,6-pentamethyl-piperidyl)]2-butyl-2-[(3,5,-t-butyl-4-hydroxyphenyl)methyl]propanedioate.

18. The coating composition of claim 17 containing in addition about 0.05–2% by weight, based on the weight of the binder, of polydimethyl siloxane.

19. The coating composition of claim 18 containing in addition about 0.05–2% by weight, based on the weight of the binder of poly 2-ethyl hexyl acrylate.

20. The coating composition of claim 16 containing in addition 0.1–5% by weight, based on the weight of the binder, of an ultraviolet light stabilizer consisting of bis(1,2,2,6,6-pentamethyl-4-piperidinyl)decane dioate.

21. The coating composition of claim 16 containing in addition pigment in a pigment to binder ratio of about 0.1/100 to 100/100.

22. A substrate coated with a layer of the composition of claim 1 containing pigment in a pigment to binder ratio of about 0.1/100 to 100/100 and having superimposed thereon a layer of a clear composition of claim 1.

23. A substrate coated with a layer of the composition of claim 1 containing pigment in a pigment to binder ratio of about 0.1/100 to 100/100 and having super imposed thereon a layer of a clear composition of claim 1 containing a blend of ultraviolet light stabilizers of a benzotriazole and a hindered amine light stabilizer.

* * * * *